Nov. 22, 1932.   R. F. KNIGHT   1,888,272
BLOCK SAWING MACHINE
Filed March 20, 1930   2 Sheets-Sheet 1

Nov. 22, 1932.  R. F. KNIGHT  1,888,272
BLOCK SAWING MACHINE
Filed March 20, 1930  2 Sheets-Sheet 2

INVENTOR.
Ralph F. Knight
By his Attorney,
Nelson W. Howard

Patented Nov. 22, 1932

1,888,272

UNITED STATES PATENT OFFICE

RALPH F. KNIGHT, OF BEVERLY, MASSACHUSETTS, ASSIGNOR TO UNITED SHOE MACHINERY CORPORATION, OF PATERSON, NEW JERSEY, A CORPORATION OF NEW JERSEY

BLOCK SAWING MACHINE

Application filed March 20, 1930. Serial No. 437,529.

This invention relates to machines for cutting work-pieces from a bolt, and is illustrated as embodied in a wood heel blank sawing machine.

Wood heel blank sawing machines of the type in common use comprise essentially a saw and a sliding and pivoted work carrier. The work-piece is a bolt of wood of rectangular cross-section, which is to be cut up into heel blanks. The longitudinal dimensions of the heel blanks lie longitudinally in the bolt and the cross-section of the bolt corresponds to a vertical transverse section of the heel blank. The front and rear faces of the blanks are cut alternately at different angles to correspond as closely as may be with the shape of the finished heel at the breast and the rear.

The work carrier is pivoted for swinging movement between two adjustable stops, to throw the work at the two desired angles relatively to the saw. Two adjustable gages are provided on the other side of the saw from the carrier, to determine the length of the blank cut in either position of the work. The sliding movement of the carrier is parallel to the saw blade, and carries the bolt past the saw, thus severing a blank at each movement. The blanks face alternately one way or the other in the bolt, and each has a front face and a rear face cut on the proper angles. The blanks, as they are severed, drop into a barrel, for example.

The use of the machine as above described results in the loss of much time due to the following considerations. In the first place, when the end of the bolt is cut off at one of the chosen angles, this end piece drops into the barrel and has to be searched for and taken out again. In the second place, when a faulty portion of the bolt comes up to the saw, the imperfect blanks cut from it also drop into the barrel and have to be found and removed, and this aspect of the matter is more troublesome than the other, as such pieces are not so easily recognizable as the end pieces.

It is an object of the present invention to remedy the difficulties above referred to, and to this end the illustrated machine is provided with a movable table or receiver for intercepting imperfect work-pieces. This table may be manually operated, as by a treadle, and when in operative position receives the piece of wood as it is cut off by the saw and prevents it from falling into the barrel. The release of the treadle causes the table to carry the imperfect piece away from the blank barrel, and to deposit it in a waste barrel located beside the blank barrel. Preferably, the table is pivoted so that it tips up when the treadle is released, and the piece of wood gravitates into the waste barrel without attention from the operator. The machine is also provided with gaging means for determining the lengths of the severed blanks, so arranged as to move into operative position as the table moves to one of its limiting positions.

These and other features of the invention comprising certain combinations and arrangements of parts will be apparent from the following description of a preferred embodiment of the invention shown in the drawings, in which Fig. 1 is a perspective of the machine, showing the movable receiver or table in inoperative position;

Figure 1:
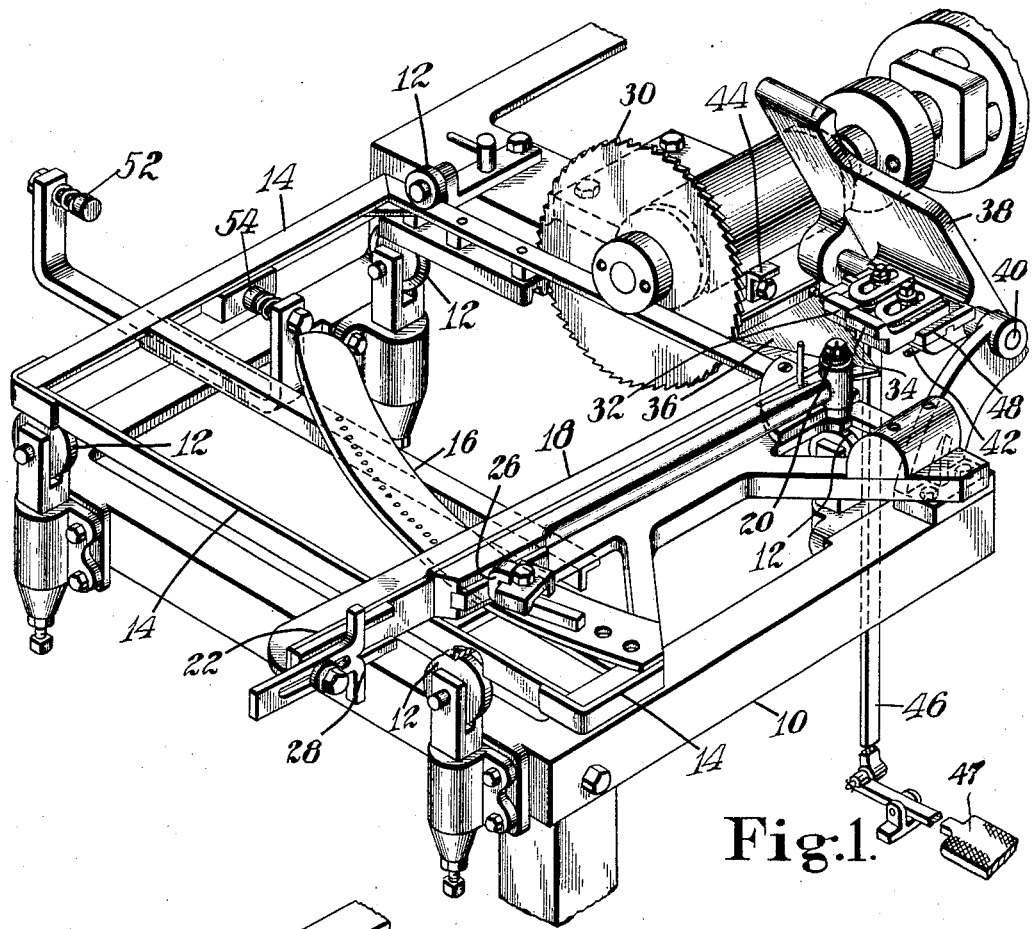

The main frame 10 is provided with rollers 12 on which slides a frame 14 provided with a horizontal guide plate 16. A work carrier arm 18 is mounted on a vertical pivot at 20 to slide over the guide plate. The arm is provided with a vertical wall 22 to serve as a support for the wooden bolt 24. The plate 16 is provided with an adjustable stop 26 which limits the movement of the pivoted arm 18 in the counterclockwise direction. An adjustable stop 28 on the arm 18 strikes the edge of the sliding frame 14 when the arm is swung clockwise, and thus limits its movement in that direction. The saw 30 is mounted on the main frame and driven in any desired way.

Figure 3:
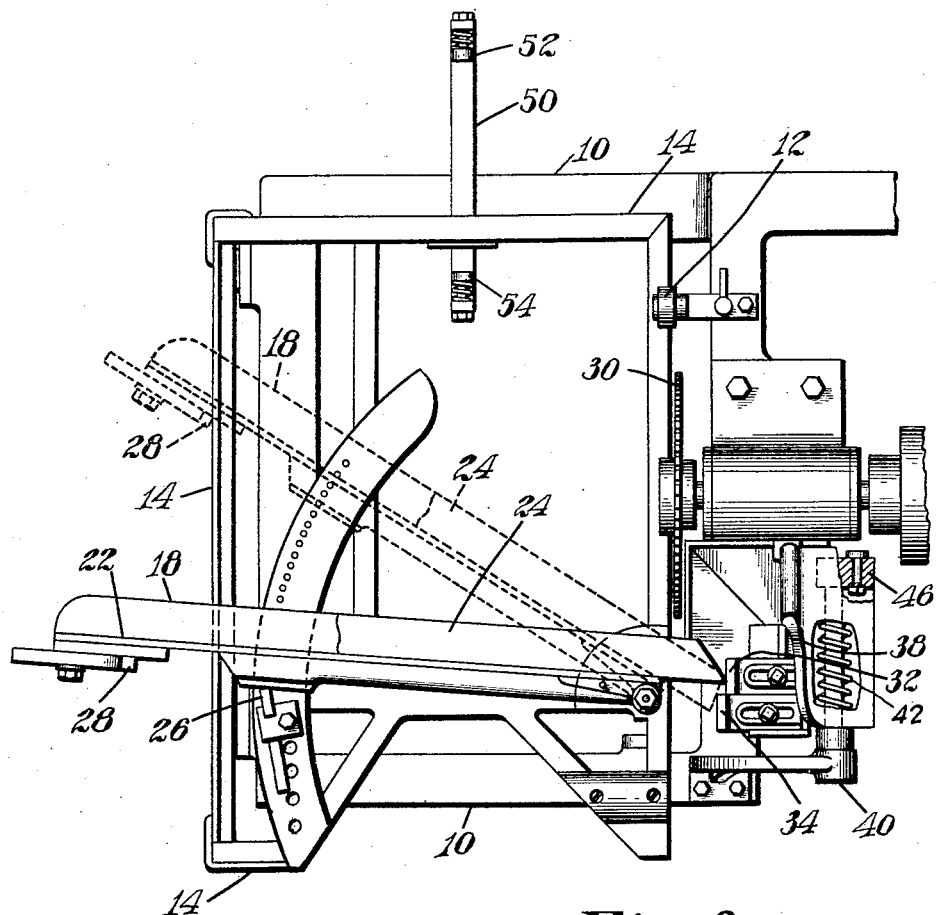
Fig. 3 is a plan.

The machine is provided with two stops 32, 34 which engage the end of the bolt 24 when the carrier arm 18 is in its full and dotted line positions, respectively (Fig. 3). These stops are adjustable toward and from the plane of the saw to regulate the lengths of the blanks cut. A receiver, shown as a hopper 36 is mounted on the frame 10 to receive the heel blanks and guide them to a barrel located beneath the hopper as they fall directly from the saw.

Figure 2:
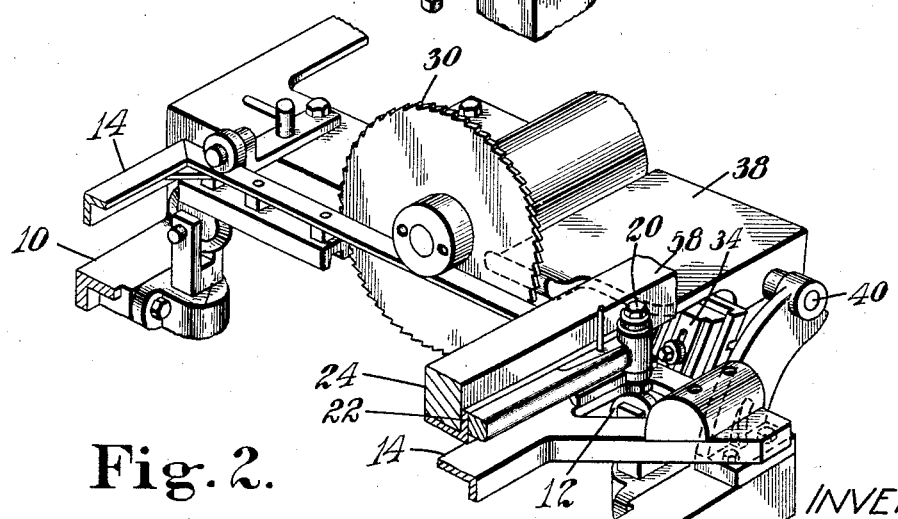
Fig. 2 is a similar view showing the table in operative position.

In using the machine as heretofore constructed (which is substantially as so far described), the operator puts a bolt on the arm 18 as best shown in Fig. 2, slides it along until it strikes the gage 32 and pushes the table 14 away from him, thus carrying the bolt past the saw and cutting off the end of it. The severed piece drops on the hopper 36 and slides into the barrel. The operator then throws the arm 18 into the dotted line position (Fig. 3), slides the bolt down until it touches the gage 34 and pushes the carriage away from him again, thus severing a heel blank. This is repeated until the bolt is used up. The end pieces and all faulty pieces fall into the barrel with the good ones.

In accordance with the present invention, a second and movable receiver or table 38 is provided, preferably pivoted, as at 40, and normally held tipped up away from the saw, as in Fig. 1, by a spring 42. It can be pulled down to horizontal position against a stop 44 by a treadle rod 46. In this position it covers the hopper 36, and receives the pieces cut off the bolt while it is in this position. When the operator releases the treadle rod 46, the table 38 swings up and slides the faulty pieces off to one side of the barrel into an adjacent waste barrel. All loss of time in searching for and removing the undesired pieces from the barrel of blanks is thus avoided.

The adjustable stops 32, 34 are preferably mounted on an arm 48 on the under side of the table 38, as shown in Fig. 1, thus enabling the table 38 to swing down through the position they normally occupy, and to take a position below the plane of the bed of the bar 18, where it can receive the faulty blanks conveniently.

A U-shaped arm 50 is mounted on the frame 10 with resilient stops 52, 54 on its ends to cushion the frame 14 as it slides back and forth.

Figure 4:
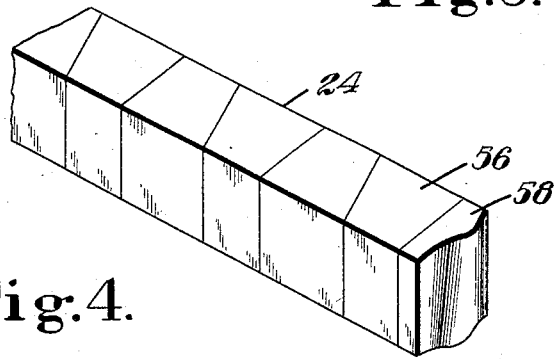
Fig. 4 illustrates the way in which the heel blanks are successively cut.

Fig. 4 illustrates the way the blanks 56 come out of the bolt 24, facing alternately backward and forward in the bolt. The end piece is indicated at 58 (Figs. 2 and 4).

Having described my invention, what I claim as new and desire to secure by Letters Patent of the United States is:—

1. In a heel blank sawing machine, a saw, a work carrier arranged to carry a bolt of wood past the saw, a receiver for imperfect blanks, normally maintained in inoperative position, to permit the severed blanks to fall freely from the saw but movable by the operator to intercept selected blanks as they drop from the saw, and gaging means for the work piece, mounted on the receiver and arranged to move into operative position as the receiver moves from one of its positions to the other.

2. In a blank sawing machine, a saw, a carrier on one side of the saw arranged to carry a work-piece past the saw, a table on the other side of the saw, said table being pivotally mounted and being normally held tipped from the saw, means whereby the operator may tip the table into a position adjacent to the saw to intercept imperfect blanks as they drop from the saw, and gaging means for the work-piece mounted on the table and arranged to come into operative position as the table swings to inoperative position.

3. In a heel blank sawing machine, a saw, a work carrier arranged to carry a bolt of wood past the saw, a receiver for selected blanks, normally maintained in inoperative position, to permit the severed blanks to fall freely from the saw but movable by the operator to intercept selected blanks as they drop from the saw, and gaging means for the work piece, movable between two positions, and operatively connected with the receiver to move from one position to the other simultaneously with movement of the receiver from one of its positions to the other.

In testimony whereof I have signed my name to this specification.

RALPH F. KNIGHT.